Oct. 5, 1926.  1,601,776

R. J. SHEIRING ET AL

PISTON ASSEMBLY

Filed March 24, 1924

Inventors
Ralph J. Sheiring
John E. Sloan

By Whitmore Hulbert Whitmore & Belknap
Attorneys

Patented Oct. 5, 1926.

1,601,776

UNITED STATES PATENT OFFICE.

RALPH J. SHEIRING AND JOHN E. SLOAN, OF DETROIT, MICHIGAN.

PISTON ASSEMBLY.

Application filed March 24, 1924. Serial No. 701,573.

The invention relates to piston assemblies and has for one of its objects the provision of a piston and connecting rod which may be disconnected from each other when the piston is located within the cylinder and from the outer end of the cylinder. Another object is the provision of an improved form of piston ring. With these as well as other objects in view, the invention resides in the novel features of construction and combinations and arrangements of parts as more fully hereinafter set forth.

Figure 1:
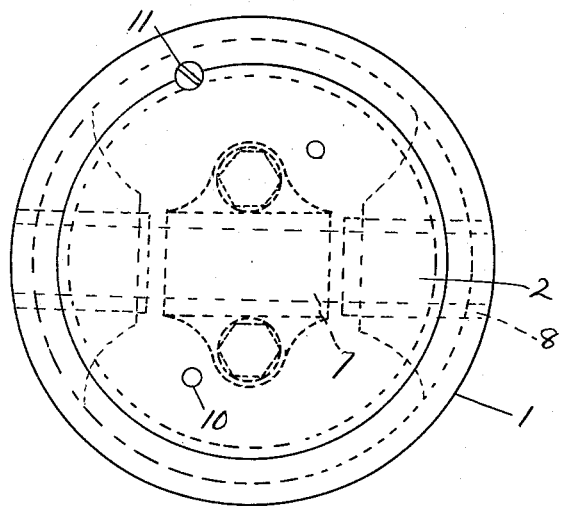
Figure 1 is a top plan view of a piston assembly embodying our invention.
Figure 2:
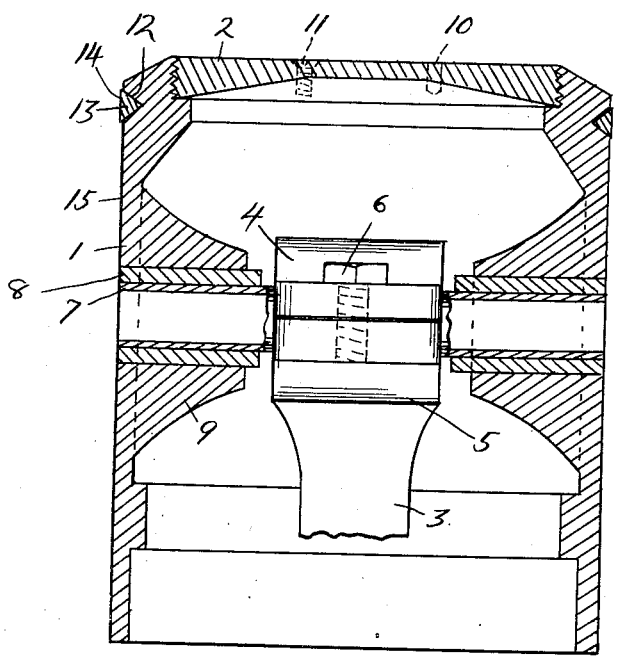
Figure 2 is a vertical transverse section therethrough.

1 is the skirt of the piston and 2 is the head. 3 is the connecting rod having at its upper end the removable bearing cap 4 which is adapted to be clamped to the lower half-bearing 5 by suitable means such as the bolts 6. 7 is the wrist pin clamped between the lower half-bearing 5 and the upper bearing cap 4 and journalled in the bushings 8 fixed in the bosses 9 of the skirt 1.

The head 2 of the piston is removable from the skirt, and as shown has a threaded engagement therewith and is provided with suitable means such as the recesses 10 in its upper face for engagement in by a tool to detach the head from the skirt, while the piston is still located within the cylinder, this operation being carried out from the outer end of the cylinder. Also, we have provided a suitable lock for holding the head from rotating relative to the skirt, this lock preferably comprising a screw 11 engaging the threads of the head and skirt. With this arrangement it will be seen that with the piston in the cylinder the head 2 may be removed from the skirt, thereby providing access to the cap bolts 6 securing the bearing cap 4 to the half-bearing 5 of the connecting rod so that these bolts may be removed, after which the bearing cap can be removed and the piston lifted upwardly out of the cylinder.

Another feature of our invention resides in forming in the outer wall of the skirt 1 the annular V-shaped groove 12 and in providing the continuous V-shaped piston ring 13 in this groove. This piston ring is preferably formed of a copper alloy, while the skirt of the piston is formed of cast iron. As a result, the piston ring has a higher coefficient of expansion than the piston skirt and as the temperature increases, will radially expand to maintain sliding contact with the cylinder wall. Furthermore, the arrangement is such that the edges of the outer face 14 of the piston ring extend beyond the outer face 15 of the piston skirt and effectually prevent oil from passing upwardly between the piston and the cylinder wall as well as prevent gasoline or other liquid fuel from passing downwardly between the piston and cylinder wall. This piston ring is preferably cast upon the piston skirt, and since the melting points of the two materials are very different liability of fusing is avoided.

With this arrangement, an under-sized piston may be used without affecting the efficiency of the engine inasmuch as the piston ring cast thereon has an outer diameter to slidably fit within the cylinder and inasmuch as this ring has an extended bearing surface owing to its relatively great width.

What we claim as our invention is:

1. The combination with a piston having an integral skirt portion with an annular V-shaped groove therein, of a continuous piston ring in said groove and formed of a material having a higher co-efficient of expansion than that of which said skirt portion is formed.

2. The combination with a piston having an integral skirt portion, an annular groove in the upper end thereof, of a continuous piston ring engaging in said groove, said piston ring being formed of a material having a higher co-efficient of expansion than the material of which said piston skirt is formed.

3. The combination with a piston having an integral skirt portion with an annular V-shaped groove therein, of an endless piston ring in said groove and formed of a material having a higher co-efficient of expansion than that of which said skirt portion is formed.

In testimony whereof we affix our signatures.

RALPH J. SHEIRING.
JOHN E. SLOAN.